June 20, 1967  K. W. CLARK  3,326,423
DEVICE FOR DISTRIBUTING LIQUIDS
Filed March 23, 1964  2 Sheets-Sheet 1

Inventor
KENNETH WILLIAM CLARK

By
Bailey, Stepherd
Attorney

June 20, 1967 K. W. CLARK 3,326,423
DEVICE FOR DISTRIBUTING LIQUIDS
Filed March 23, 1964 2 Sheets-Sheet 2
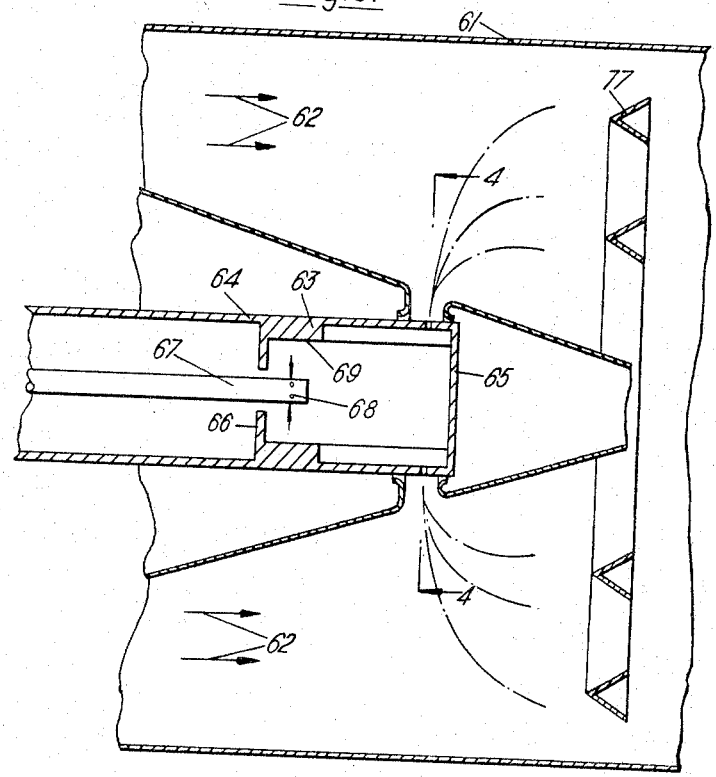
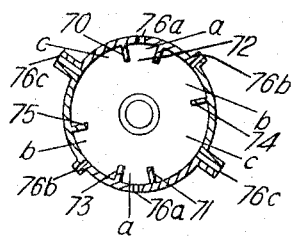
Inventor
KENNETH WILLIAM CLARK
By Bailey, Stephens
Huttig
Attorneys

United States Patent Office 3,326,423
Patented June 20, 1967

3,326,423
DEVICE FOR DISTRIBUTING LIQUIDS
Kenneth William Clark, Bristol, England, assignor to Bristol Siddeley Engines Limited, Bristol, England, a British company
Filed Mar. 23, 1964, Ser. No. 353,933
6 Claims. (Cl. 222—330)

The invention relates to a device for distributing liquid, for example lubricating oil, between a number of discharge channels in predetermined relative quantities.

According to the invention a liquid distributing device comprises: a sleeve mounted for high speed rotation about its axis and comprising at least two splines defining the side walls of recesses extending along the inner surface of the sleeve; at least one port extending through the sleeve from each recess; and supply means for regulating and discharging a supply of liquid into the sleeve so as to be initially dispersed by the rotation thereof into a circumferentially substantially uniform layer and then collected in the recesses in relative quantities dependent upon their relative widths and centrifuged out through the ports.

Preferably, to avoid a quantity of liquid remaining dead in the recesses, the radius to the base of the recesses from the axis of rotation of the sleeve is constant, or increases as one progresses axially from the position of entry of liquid into a recess to the position of the port leading from the recess.

In one arrangement according to the invention the means for discharging a supply of liquid into the sleeve is arranged to discharge the liquid along a free trajectory into contact with the splines so as to be initially finely dispersed by impact therewith in a free space within the sleeve and then to be collected in the recesses and centrifuged out through the ports. In this arrangement each recess has an end wall spaced axially from the impact position oppositely from the port to restrict spread of liquid away from the port. Each recess may also have a wall at its other end, to limit travel of liquid in that direction, or the port may extend across the whole width of the recess for the same purpose.

In another arrangement according to the invention the recesses extend to a surface of revolution which is part of the sleeve and onto which liquid is discharged by the discharge means and on which the liquid forms, by reason of the high speed of rotation of the surface, a circumferentially uniform layer before it reaches the recesses.

The supply means may be arranged to discharge the liquid into the sleeve continuously or intermittently, intermittent discharge being preferred in cases in which the required flow of liquid is small, as for example in a total-loss lubrication system. During each period of discharge, the distribution of liquid around the sleeve is substantially uniform, so that the desired distribution rates among the recesses is still achieved.

The invention is illustrated by the examples shown in the accompanying drawings. In the drawings:

FIGURE 3 is an axial section through a device for distributing liquid fuel across a duct in which it is to be burnt in a stream of combustion-supporting gas; and FIGURE 4 is a cross-section through the sleeve of FIGURE 3 on the line 4—4 in FIGURE 3.

Figure 1:
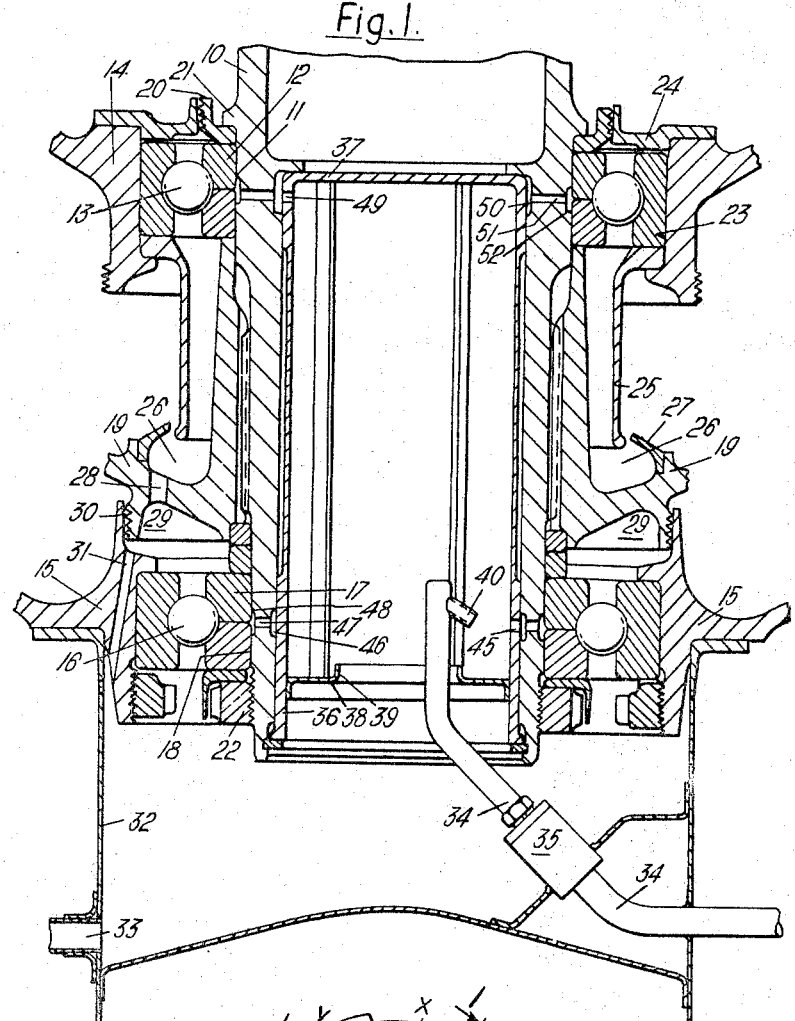
FIGURE 1 is a section on two axial planes at right angles (corresponding to the line 1—1 in FIGURE 2) through a lubricating oil distributor in a gas turbine engine.

In FIGURE 1 the lower end of the low-pressure spool shaft of a two-spool gas turbine engine is shown at 10.

The engine may operate with its rotation axis vertical, as shown, or with its axis horizontal or inclined. The shaft 10 is hollow and has an external seating 11 for the split inner race 12 of a ball bearing 13 which carries a flange member 14 to which is attached a turbine disc (not shown) forming part of the high pressure spool assembly. The shaft 10 is journalled at its lower end in a stationary diaphragm member 15 by means of a second ball bearing 16 the split inner race 17 of which is carried on a seating 18 on the shaft. A flange member 19, to which is bolted a low pressure turbine disc (not shown) forms a spacer between the inner races 12 and 17, the whole assembly, including a labyrinth seal member 20 above the bearing 13, being locked up against a shoulder 21 by means of a ring nut 22 screw-threaded on the shaft 10. The outer race of the bearing 13 is located in a recess 23 in the flange member 14 between a counter member 24 for the labyrinth seal 20 and a tubular member 25 which guides oil which has passed through the bearing 13 into a collection groove 26 formed on the upper face of the flange member 19 by an attached rim 27. From the groove 26 the used oil passes through holes 28 in the flange member 19 into a cavity 29 which contains the bearing 16 and is closed outwardly by a labyrinth seal 30 between the flange member 19 and the diaphragm member 15. Oil from the cavity 29, including oil discharged from the lower bearing 16, passes through holes 31 in the member 15 into a collection casing 32 provided at its lowermost part with a drain pipe 33.

Figure 2:
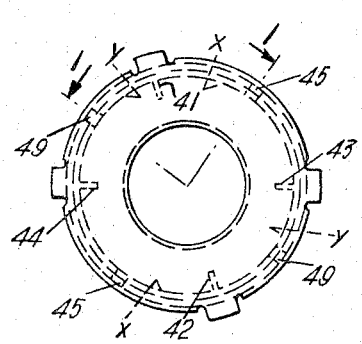
FIGURE 2 is an axial view of the sleeve forming part of FIGURE 1, seen from the bottom in FIGURE 1.

Oil for distribution to the bearings is supplied by a metering pump (not shown) through a pipe 34 containing a pressurising valve 35 into a sleeve 36 housed in the hollow interior of the shaft 10. The sleeve extends upwards a short distance beyond the plane of division of the inner race 12 of the upper bearing and is closed at that end by an end wall 37. At its lower end, at a position somewhat below the plane of division of the inner race 17 of the lower bearing, the sleeve is partially closed by an annular end wall 38, having an upturned lip 39, through the central opening of which the oil supply pipe 34 projects, the end of the pipe being provided with a discharge spout 40 of comparatively large bore, so that there is no danger of its becoming blocked. On the interior surface of the sleeve 36 four lengthwise extending recesses x, y, x, y are formed by two sets of diametrically opposite splines 41, 42 and 43, 44, see FIGURE 2. The recesses x defined between the splines 41 and 43 and 42 and 44 extend over an angle of 108° and each has a port 45 extending through the sleeve to a collection groove 46 in the inner surface of the shaft 10. From the groove 46 radial passages 47 extend through the shaft to an external collection groove 48 in the region of the plane of division of the inner race 17. The recesses y defined between the splines 41 and 44 and 42 and 43 correspondingly extend over an angle of 72° and each has a port 49 extending through the sleeve to an inner collection groove 50 connected by passages 51 to an outer collection groove 52 in the region of the plane of diversion of the inner race 12.

In operation, a quantity of oil, metered in dependence upon a suitable parameter of engine loading, is discharged through the spout 40. The discharge may be intermittent when the oil quantity is small, as in a system operating on the total-loss principle, or more or less continuous when operating on the circulation principle. When the engine axis is subsantially vertical, the oil drops onto the annular end wall 38, constituting a flat surface of revolution, and, owing to the high speed rotation of the latter, is immediately spread uniformly and carried outwards into the recesses by centrifugal force. Each recess thus receives a proportion of the oil dependent upon its width, i.e. its angular extent, and in this example the recesses between the splines 41 and 43, and 42 and 44 receive 60% of the oil while the other recesses receive the remaining 40%. The high centrifugal force causes the oil to spread evenly along the recesses and to be centrifuged out through the ports 45 and 49, 40% of the oil going to the upper bearing 13, which carries the upward thrust only of the high pressure spool, and the remaining 60% going to the lower bearing 16, which carries the sum of the thrusts of both spools. When the engine is operating with its axis horizontal, or inclined by more than a certain angle, the oil discharged from the spout 40 falls upon the rapidly moving splines, and in this case the impact causes the oil to be initially finely dispersed into the free space within the sleeve. As the atmosphere in the sleeve is also rotating, the particles of oil are quickly thrown out spirally, to be collected by the recesses in relative quantities dependent upon the width of the recesses, as before. The oil can of course be distributed in equal proportions if desired, by having the recesses of the same width.

The sleeve 36 may extend through the engine to supply oil to a second pair of bearings, one of which supports the front end of the shaft 10 in the stationary casing and the other supports the front end of the high pressure spool assembly on the shaft 10. In this case each of the four recesses may be provided with a port through which oil is discharged to a different bearing, the ports being spaced axially along the sleeve, or more than four recesses may be provided, one or more of the bearings being supplied from two or more recesses.

For very high speed rotation, as in a gas turbine engine, the inner surface of the sleeve is preferably cylindrical, but it could be slightly conically divergent from the landing region of the oil discharged from the spout 40 to the region of the ports through which it is centrifuged out of the recesses.

FIGURES 3 and 4 illustrate diagrammatically an application of the invention for dispersing liquid fuel into a duct 61 along which air or other combustion supporitng gas flows in the direction of the arrows 62 from a compressor or turbine (not shown). A fuel distributing sleeve 63 is attached as an extension to the shaft 64 of the compressor or turbine and has a rear end wall 65 and an annular front end wall 66 through which a fuel supply pipe 67 extends. The fuel is discharged through orifices 68 into contact with a plain cylindrical surface of revolution 69 forming part of the inner surface of the sleeve, so that it spreads evenly over this surface. Between the surface 69 and the end wall 65 the sleeve is provided with three sets of diametrically opposite splines 70, 71, 72, 73 and 74, 75. The angular spacings between these sets of splines are in the ratio of 1:2:3, i.e. 30°, 60° and 90°, so that the recesses a, b and c, which they define collect quantities of fuel in the same proportions. The recesses a, b and c are provided respectively with fuel discharge ports 76a, 76b, and 76c, the diameters of which are selected to give flow numbers in the same ratio as the widths of the recesses, i.e. 1:2:3.

In operation, the ports run full, and the jets of fuel centrifuged out though the larger ports have greater momentum relative to their surface areas than the fuel centrifuged out through the smaller ports and therefore have greater penetration into the stream of combustion-supporting gas flowing through the duct. In this way, therefore, a more even distribution of the fuel across the duct can be obtained. Combustion of the fuel takes place in the wake of suitable flame-holding devices 77.

Some or all of the recesses may have more than one port, the ports being spaced circumferentially or axially, and the progressively larger ports may be extended radially outwards increasing distances, as shown in FIGURE 4, so as to increase the centrifugal head generated in them and therefore the "throw" of the jets.

If the fuel supply pipe 67 can be stationary, or have a large differential rotary speed relatively to the sleeve, the recesses may be continued up to the front end wall 66, the impact of the fuel on the splines then causing initial dispersion in the space within the sleeve as described in connection with the first example when operated with the engine axis horizontal.

The device may be modified to permit variation of the ratio of the flows by having the splines non-parallel, so that the ratio of the arcs covered by adjacent recesses varies axially, and by providing for axial adjustment of the supply pipe (34 or 67).

I claim:
1. A liquid distributing device comprising: a sleeve; at least two splines on the sleeve, defining the side walls of recesses extending along the inner surface of the sleeve; at least one port extending through the sleeve from each recess; means mounting the sleeve for high speed rotation about its axis; and supply means adapted to regulate and discharge a supply of liquid into the sleeve so as to be initially dispersed by the rotation thereof into a circumferentially substantially uniform layer and then collected in the recesses in relative quantities dependent upon their relative widths and centrifuged out through the ports, said splines being unequally spaced around the sleeve to form recesses of differing width.

2. A device according to claim 1, in which the radius to the base of the recesses from the axis of rotation of the sleeve is uniform.

3. A device according to claim 1, in which the means for discharging a supply of liquid into the sleeve is arranged to discharge the liquid along a free trajectory into contact with the splines so as to be initially finely dispersed by impact therewith in a free space within the sleeve and then to be collected in the recesses and centrifuged out through the ports.

4. A device according to claim 1, in which the recesses extend to a surface of revolution which is part of the sleeve and onto which liquid is discharged by the discharge means and on which the liquid forms, by reason of the high speed of rotation of the surface, a circumferentially uniform layer before it reaches the recesses.

5. A device as claimed in claim 1, in which said mounting means mount the sleeve to turn about a substantially vertical axis, and an annular end wall is provided at the lower end of the sleeve below the point of discharge of liquid into the sleeve.

6. A device according to claim 1 in which the diameters of the ports are proportional to the width of the respective recesses.

References Cited

UNITED STATES PATENTS

| | | | |
|---|---|---|---|
| 521,104 | 6/1894 | Davis | 233—28 |
| 685,874 | 11/1901 | Sharples | 233—27 |
| 809,685 | 1/1906 | Hellstrom | 233—28 |
| 2,030,611 | 2/1936 | Schmidt | 184—6 |
| 2,784,551 | 3/1957 | Karlby et al. | 60—39.08 X |
| 2,911,267 | 11/1959 | Small. | |

LAVERNE D. GEIGER, *Primary Examiner.*

E. J. EARLS, *Assistant Examiner.*